United States Patent [15] 3,661,311

Warren [45] May 9, 1972

[54] RECORD MEDIUM GUIDE

[72] Inventor: Henry Ray Warren, Indianapolis, Ind.

[73] Assignee: RCA Corporation

[22] Filed: Mar. 21, 1969

[21] Appl. No.: 809,256

[52] U.S. Cl. ........................................226/198, 179/100.2 T

[51] Int. Cl. ....................................B65h 23/32, G11b 15/60

[58] Field of Search.........................................179/100.2 T; 226/196–199, 190

[56] References Cited

UNITED STATES PATENTS

| | | | |
|---|---|---|---|
| 3,495,753 | 2/1970 | Pollaschek | 226/198 |
| 3,513,458 | 5/1970 | Altonji et al. | 179/100.2 |
| 2,647,491 | 8/1953 | Toggenburger | 226/196 |
| 3,354,269 | 11/1967 | Rank | 179/100.2 |
| 3,363,065 | 1/1968 | Tanigawa | 179/100.2 |
| 3,414,684 | 12/1968 | Lichowsky | 179/100.2 |

*Primary Examiner*—Bernard Konick
*Assistant Examiner*—J. Russell Goudeau
*Attorney*—Edward J. Norton

[57] ABSTRACT

A device for guiding a record medium in a recorder-reproducer system. The arrangement includes guide members intersecting the supporting surface of the record medium, to provide an uninterrupted edge guiding surface along the path of the record medium.

4 Claims, 5 Drawing Figures

Figure 1B:
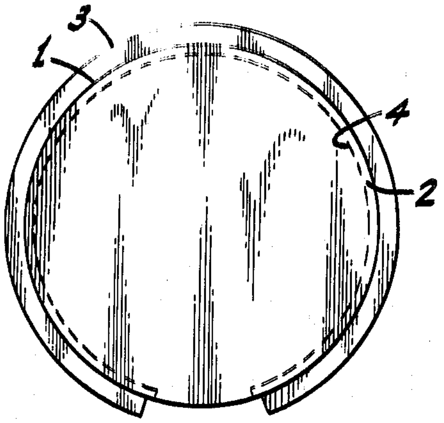

INVENTOR
HENRY RAY WARREN

BY Edward J Norton
ATTORNEY

RECORD MEDIUM GUIDE

This invention relates to a record medium guiding device for use in apparatus for recording and/or reproducing signals.

In many magnetic recorders and particularly in those used in video recording, the moving record medium is skewed with respect to a rotating transducer, so that the recorded track on the record medium is at an oblique angle on the record medium. In such systems the tape is arranged to travel in a helical path over a portion of a supporting surface in which the transducers are mounted. In such systems, the tracks recorded on the record medium usually are very narrow and form lines running close to one another. Therefore, the path of the tape over the supporting surface is of great importance, since recording or playback takes place while the record medium is on the supporting surface. Thus, it is desirable to provide tape guide members along the path of the record medium over the supporting surface, and laterally guide the record medium.

Prior art apparatus have attempted to solve this problem, by provision of guides which are attached to the peripheral plane of the supporting surface. However this approach is not completely acceptable, since the edges of the record medium have a tendency to seat themselves in any small crack or joint between the guide member and supporting surface. This results in irregular motion or binding of the record medium which cannot be tolerated.

It is therefore an object of the present invention to provide an improved means of edge guiding a record medium in recorder-reproducer systems.

In accordance with the present invention, there is provided a recorder-reproducer system of the type having a supporting surface including a path over which a record medium is passed. The supporting surface has a groove therein extending along one side of the record medium path. A guiding member is situated in the groove. The guiding member has a portion in contacting relation with at least the portion of the groove most proximate to the path, which intercepts the supporting surface. The guide member extends outward from the groove to a point beyond the edge of the record medium.

Figure 1A:
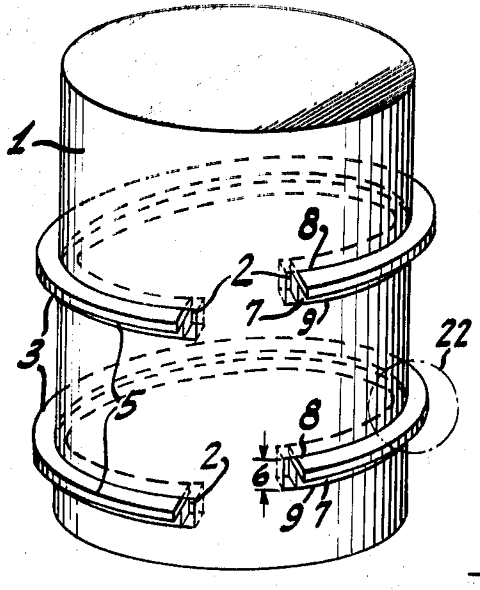

Turning to the drawing for a more detailed description of the present invention;

FIG. 1*a* is a perspective view of a record medium guiding arrangement according to the present invention.

FIG. 1*b* is a top view of the arrangement of FIG. 1*a*.

Figure 1C:
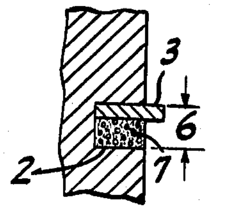

FIG. 1*c* is an enlarged view in cross-section of a portion of FIG. 1*a*.

Figure 2A:
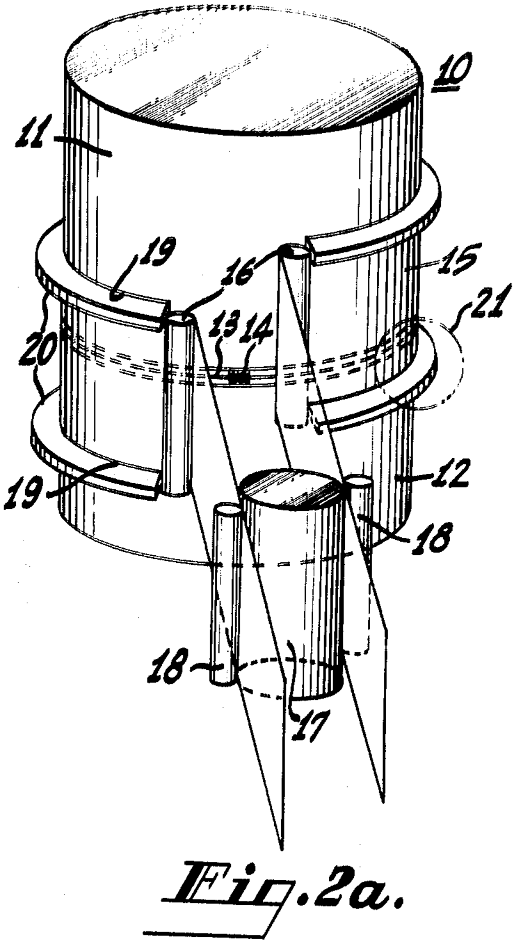

FIG. 2*a* is a perspective view of a recorder-reproducer apparatus embodying the present invention.

Figure 2B:
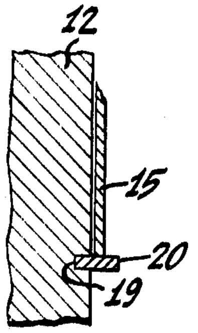

FIG. 2*b* is an enlarged view in cross-section of a portion of FIG. 2*a*.

If reference is made to FIG. 1, there is shown an arcuate supporting surface 1, which for purposes of explanation is shown as a drum or cylinder. In the periphery of the supporting surface 1, there are two grooves 2 extending along the supporting surface 1. Preferably the grooves are equidistant from each other about the surface 1 to define a path for a record medium. While two grooves are shown, for certain applications and orientations of the supporting surface, a single groove will be sufficient. Disposed in the grooves 2 are individual guiding members 3. The guide members 3 extend continuously along and substantially coextensive with the grooves 2.

As can be seen from FIG. 1*b*, the guide members 3 extend continuously from the bottom or inner portion 4 of the grooves 2, which is below or within the periphery of the supporting surface 1, to a point beyond the periphery of the supporting surface 1. The facing surfaces 5 of the guide members 3 are preferably smooth, planar and intersect the periphery of the supporting surface 1, at substantially a 90° angle. Each of the guide members 3 has a portion which contacts the portion of the groove 2 which intercepts the supporting surface 1. Since there is contacting relation between the guide member 3 and the edge 8 of the groove 2 nearest the record medium path no crack or joint exists in the plane of the supporting surface 1, between the guide member 3 and the supporting surface 1. The result is that a smooth continuous uninterrupted guiding surface continguous to the supporting surface 1 is provided.

FIG. 1*c* is an enlarged view of the circled portion 22 of FIG. 1*a*. As can be seen from FIG. 1*c*, in the embodiment of FIG. 1, the width 6 from side to side of the grooves 2, is larger than the width or thickness of the guide member 3. To maintain the guide member 3 in contacting relation with the edge 8 of the groove 2, a resilient means 7 is interposed between the guide member 3 and the edge 9 of the groove 2. For example the means 7, may be a compressible rubber material having an uncompressed thickness greater than the dimension between the guide 2 and the edge 9. Alternatively the means 7 may be a spring member which when stretched expands laterally.

If reference is made to FIG. 2, there is shown a recorder-reproducer system embodying the present invention. In FIG. 2*a* there is shown a supporting surface, in the form of a drum or cylinder 10 comprising halves 11 and 12. Between the halves 11 and 12 is a scanning disc 13. On the scanning disc 13 is a transducer 14, mounted for coaction with a record medium 15. The record medium 15 traverses a path helically about the cylinder 10, and is skewed with respect to scanning disc 13. The record medium 15, is guided toward and away from the cylindrical supporting surface 10, by means of an idler roller assembly 16. A capstan 17 and pinch rollers 18 are provided, for moving the record medium about the cylinder 10.

In the peripheral surface of each of the cylinder halves 11 and 12, there is a groove 19 extending substantially about the cylinder 10, in a parallel juxtaposed relation to the record medium 15. Disposed in each of the grooves 19 is a member 20, having a surface adapted to edge guide the record member 15, with the member 20 extending substantially about the cylinder 10. The guide members 20 are equidistantly spaced about the cylinder 10, by a distance which is at least equal to the width of the record medium 15.

FIG. 2*b* is an enlarged view of the circled portion 21 of FIG. 2*b*. As shown in the embodiment of FIG. 2*b*, the guide member 20 extends from the bottom portion of the groove 19, to a point beyond the plane containing the edge of the record medium 15. The width or thickness of the guide member 20 is such as to completely fill the groove 19. This provides the desired contact between a portion of the member 20, and the edge of the groove 19 which intercepts the portion of the supporting surface 1 constituting the path for the record medium 15. Thus an uninterrupted guiding surface is provided, intersecting the peripheral surface about the cylinder 10.

Where desired the guide members 3 of FIG. 1, and guide members 20 of FIG. 2, may be planar, generally ring shaped and made from a resilient material such as steel. When the members are inserted in the grooves, they are distressed or distorted. This distortion of the resilient material, provides a self tensioning of the members against the inner portion of the grooves. Thus the guide members may be maintained in the grooves, without additional attaching or holding means.

The present invention has been shown and described in relation to a helical type recorder-reproducer system, having a scanning transducer disc and a record medium path substantially about the supporting surface. It is to be understood however, that the present invention is also applicable to other known helical scan arrangements of the record medium, transducers and supporting surface. The present invention may also find application in other types of recording reproducing arrangements such as those known as transverse and longitudinal scan systems.

What is claimed is:

1. In a recorder-reproducer system of the type having a supporting surface including a path over which a record medium is passed, the combination therewith comprising: said supporting surface having a groove therein extending along one side of said record medium path; a guiding member in said groove; said guiding member extending outward from said groove to a point beyond the edge of said record medium; said member in said groove also having a width less than the width of said groove from side to side; and separate resilient means interposed between and in direct contact with both said guide member and the side of said groove furthest from said record medium path for maintaining said guiding member in said groove in contacting relation with the portion of said groove most proximate to the path over said supporting surface.

2. The invention according to claim 1, wherein; said groove has a rectangular cross-section with said guide member being smooth, planar and intersecting said supporting surface at substantially a 90° angle.

3. The invention according to claim 1, wherein; said resilient means comprises a compressible body of material having an uncompressed thickness greater than the dimension between said guiding member and the portion of said groove not most proximate to said path over said supporting surface.

4. The invention according to claim 1, wherein; said resilient means comprises a spring member arranged to urge said guiding member into edge guiding relation with said record medium.

* * * * *